Figure 1:
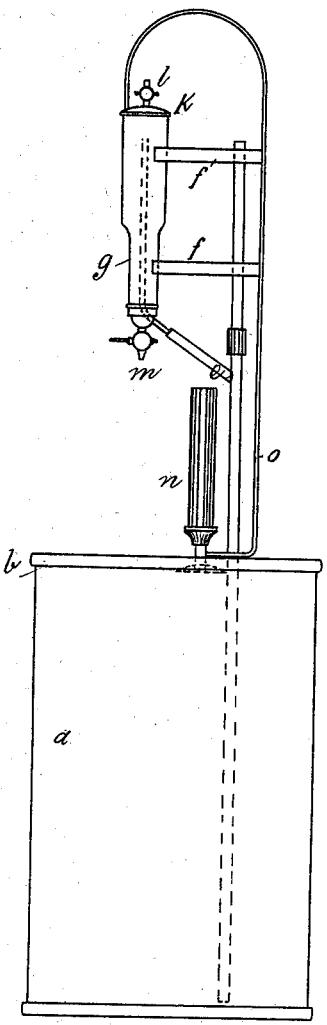

No. 733,083. PATENTED JULY 7, 1903.
W. SCHMITT.
APPARATUS FOR POURING OUT LIQUIDS.
APPLICATION FILED MAY 19, 1902.

NO MODEL.

Witnesses
Otto Penner
Alfred Dicke

Inventor
Wilhelm Schmitt
by N. Daunas
Atty

No. 733,083. Patented July 7, 1903.

UNITED STATES PATENT OFFICE.

WILHELM SCHMITT, OF SCHWELM, GERMANY.

APPARATUS FOR POURING OUT LIQUIDS.

SPECIFICATION forming part of Letters Patent No. 733,083, dated July 7, 1903.

Application filed May 19, 1902. Serial No. 108,102. (No model.)

*To all whom it may concern:*

Be it known that I, WILHELM SCHMITT, a subject of His Majesty the Emperor of Germany, residing at Schwelm, in the Province of Westphalia, Germany, have invented a new and useful Improvement in Apparatus for Pouring Out Liquids, of which the following is a specification.

My invention relates to an apparatus by which liquids of any kind may be poured out in a desired quantity in bottles or the like vessels; and it has for its object the combination and arrangement of parts by which the drawing out of the liquid is performed in an easy and convenient manner, as will be hereinafter explained, and claimed at the end of this specification.

Figure 2:
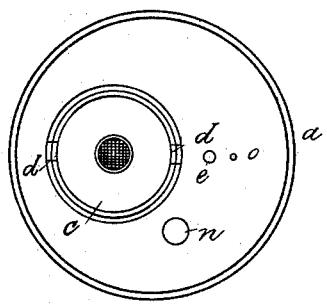

Figure 1 is an external view of the apparatus. Fig. 2 is a plan thereof.

In the accompanying drawings, $a$ represents a barrel, preferably made of iron, in any desired shape, cylindrically or in form of a cask, which is provided at its top with an opening $b$ for filling the barrel with any liquid—for instance, petroleum or the like. Said opening may be closed by a cover or lid $c$, which is provided with loops $d$, fitting with other loops on the top plate, so as to allow a padlock to enter said loops in order to close the barrel. From said barrel projects upward a standard-post $e$, carrying, by means of two horizontal arms $f$, a measuring-cylinder or other vessel $g$, which is constructed of glass, celluloid, or any other material. The standard-post $e$ forms in its lower part or from the coupling-band $h$ downward a tube which reaches nearly to the bottom of the barrel. From said tube branches a side tube $i$, which enters the bottom of the cylinder and projects nearly to its top. The cylinder, which is closed by a suitable lid $k$, carries thereon an air-valve $l$ and is provided at its bottom with a spigot $m$. On the top plate of the barrel is mounted an air-pump $n$, which may be of any construction. I have chosen one by which the piston is securely fastened to said top plate and assumes a stationary position, while the cylinder may be moved up and down for operating the pump. From said pump leads a tubing $o$ to the top of the cylinder $g$, as shown in the drawings.

The operation of my device is as follows: The barrel is filled with liquid—for instance, petroleum—which should be poured out for retail in small quantities, as one, one-half, three-fourths liter, or pints. The air-pump is operated as described before, and by means of it the measuring-cylinder is evacuated, so that the liquid may enter the measuring-glass in the desired quantity, which may be exactly regulated by the number of strokes given to the pump-cylinder by hand. The air-valve is then opened and also the tappet, and now the liquid may run out the measuring-glass.

It may be mentioned that it is easy to provide the tappet with an air-inlet, so that the air-valve may be dispensed with, and only the tappet must be handled. The inlet-tube $i$ serves at the same time for overflowing purposes, by which the liquid is filled in the desired height.

In order to prevent damages by means of developing gases, the cover of a barrel may be provided with a stopper containing safety-sieves, which allow the inflammable airs to escape, but hinders the flame of a light to enter.

What I claim, and desire to secure by Letters Patent, is—

The combination with the barrel having a stand-pipe and a measuring vessel said vessel being carried by arms $f, f$ projecting from the stand-pipe, a pipe projecting from said stand-pipe entering the measuring vessel and opening near its top said pipe serving as overflowing means, and an air-pump fixed to the top of the barrel having connection by a pipe to the top of the measuring vessel its cylinder being arranged reciprocating for the purpose described and set forth.

WILHELM SCHMITT.

Witnesses:
OTTO KÖNIG,
J. A. RITTERSHAUS.